United States Patent Office 2,778,737
Patented Jan. 22, 1957

2,778,737
PROCESS AND METHOD OF MAKING SPARKLING BEVERAGE JELLY

Fred B. Du Bridge, San Jose, Calif.

No Drawing. Application August 2, 1954,
Serial No. 447,398

2 Claims. (Cl. 99—129)

The present invention relates to the process and method of making jelly from carbonated or sparkling beverages in such a manner that the ultimate product simulates the natural beverage in appearance as well as flavor.

At the outset, it should be understood that the ultimate product is to be presented to the purchasing public in glass containers so that the product can be visually inspected by the buyer and that its appearance induces the purchase because of the genuine characteristics of the product, namely, the bubbles.

In particular, this invention relates to the making of jelly from champagne or any other sparkling beverage characterized by the presence of bubbles therein.

More specifically, this invention resides in the process and method of producing in such jelly the presence of bubbles while in a semi-hardened or fixed state so as to capture these bubbles within the final product and render them visible through the glass container in which the product is presented to the purchasing public.

The invention broadly lies in the steps and method of handling sparkling beverages such as champagne in the course of producing jelly therefrom so as to attain the bubbly appearance in the solid or semi-solid final product. In this connection, it should be understood that the process of making jelly as such may be old and well known in the art. However, since the process of making jelly involves a heating, cooking and/or boiling of the basic juice or flavored liquid it will be apparent that when such jellies are made from genuine carbonated beverages such beverage must be degasified or flattened into a pure liquid state free from carbonation. Consequently, the ultimate product such as stiffened jelly having the basic flavor of the original carbonated beverage would also be flat in appearance and uninviting to descriminating purchasers due to the lack of genuine appearance in the ultimate product.

Moreover, from a commercial as well as a psychological standpoint anything represented as jelly made from a sparkling vintage such as champagne must be presented with a sparkly or bubbly appearance in order to have the genuine characteristics of the original beverage from which it is made.

With these facts in mind, it is an object of this invention to make a jelly from sparkling wines which have been flattened so as to obtain the base flavor of the original beverage. In the course of processing this jelly, this invention contemplates the creation of air bubbles within the partially prepared jelly substance while it is in a semi-solid state. Then at this precise stage, it is proposed that the partially prepared jellies be cooled so that the jelly sets up or stiffens before escape of the bubbles therefrom. That is to say, so that the bubbles become suspended in the jelly and give it the appearance of the genuine beverage which forms the basic flavor for the ultimate product.

In practicing this invention, the first step is to open bottled genuine champagne or sparkling beverages so as to relieve therefrom the gases therein. In other words, the selected beverage is allowed to stand for a time sufficient to render the beverage flat, that is to say, completely degasified. This flattened sparkling beverage is then used as the basic flavor for the jelly which is prepared in the usual manner by admixture therewith of sugar, pectins and citric acid in proper proportion to assure ultimate jellying of the final product.

This step of the process is performed over a source of heat in the usual manner so as to bring the admixture of the basic beverage and essential ingredients to a boil for a predetermined time which will assure jelling to a solid or semi-solid state as desired. It is preferred that the sugar, pectin and citric acid be admixed and brought to a boil before the basic beverage is added. In this manner the delicate flavor and bouquet of the champagne or wine base is retained.

The foregoing partially prepared jelly, that is the essential ingredients with base flavored beverage added, is then allowed to cool sufficiently to reduce the partially prepared jelly into a semi-solid state which will hold air bubbles in suspension. At this stage, the partially prepared jelly is yet in a fluid state but sufficiently thick or viscous to hold air bubbles within it in a suspended state. At that precise moment this partially prepared fluid is poured into the glass containers with sufficient force to create air bubbles within its body after which the glass container and partially prepared jelly with bubbles therein is quickly stiffened.

It should here be noted that some pectins set up more quickly than others. When those pectins which are slow in setting up are used, the partially prepared jelly with bubbles therein is subjected to a sudden cooling so that the jelly stiffens or sets up quickly and thereby prevents the escape of the air bubbles therefrom. With pectins which set up quickly at room temperature the partially prepared jelly is merely allowed to cool and thus stiffen.

In conjunction with the foregoing and final step of creating air bubbles in the jelly, this step can be attained in several different ways. As previously stated, air bubbles can be created in the partially prepared jelly by agitating the same simultaneous with the pouring of the same into the glass containers, while the partially prepared jelly is in a semi-fluid not quite stiffened state or stage.

Another manner of producing bubbles in the thickened mass of partially prepared jelly is by forcing this thickened mass through an apertured nozzle at high pressure simultaneous with filling of the glass containers. This will immediately present within the semi-fluid mass a surge of air bubbles which have a tendency to rise and escape. However, these air bubbles cannot escape or would escape so slowly due to the thickened consistency of the mass that by reason of the quick setting or cooling which immediately follows the filling of the glass containers these air bubbles are captured within the ultimate product and the air bubbles suspended therein.

As previously stated, the final step of agitating the semi-thickened mass of partially prepared jelly simultaneous with the pouring thereof into the glass container can be accomplished by whipping this partially prepared jelly so as to render it frothy incident to pouring thereof into the glass container. Consequently, as soon as the ultimate product begins to have the appearance of sparsely arranged air bubbles therein, the cooling step will follow and capture the remaining bubbles therein so as to give the ultimate product the appearance of the genuine beverage forming the base flavor for the jelly.

It is of course possible to inject into the semi-fluid partially prepared jelly, a charge of carbon dioxide gas, which is commonly used in the manufacture of carbonated beverages, followed by a sudden chilling of the semi-fluid partially prepared jelly to capture therein these gaseous bubbles.

While I have disclosed the process and method of making jelly simulating bubbly beverages, it will be apparent that variation in mechanism and means for producing air bubbles within the semi-solid mass or fluid can be employed other than those described herein. I therefore desire to avail myself of all modifications and variations in the steps or mechanization available to completing such steps as contemplated by the spirit of this invention and as defined in the appended claims.

I claim:

1. The method of making sparkling beverage type jelly which comprises degasifying a sparkling type beverage, admixing the latter with pectins and sugars, subjecting the mixture to heat sufficient to assure jelling thereof, allowing the heat treated mixture to cool to a condition of sufficient viscosity to prevent the rapid rise of gas bubbles therein, filling transparent containers with the thus cooled mixture, introducing discrete gas bubbles throughout the mixture in the container, and setting the jelly with the discrete bubbles distributed therein.

2. The method of preparing a sparkling wine type jelly which comprises combining ingredients for making an edible jelly, cooking the ingredients, flavoring the ingredients, with a quantity of flat, sparkling type wine, allowing the cooked, flavored mass to cool to a pourable consistency of sufficient viscosity to prevent the rapid rise of bubbles therein, pouring the liquid into glasses with sufficient turbulence to create discrete bubbles throughout the mass in the glass, and cooling the mass in the glass to trap the bubbles in situ therein, thereby giving the jelly an appearance suggestive of a sparkling beverage, with small discrete bubbles distributed therein.

References Cited in the file of this patent

UNITED STATES PATENTS

| 1,607,364 | Raffeto | Nov. 16, 1926 |
| 2,163,164 | Wickenden | June 20, 1939 |

OTHER REFERENCES

"Modern Encyclopedia of Cooking" by Meta Given, volume I, J. G. Ferguson and Associates, Chicago, 1949, page 804.

"The American Woman's Cook Book" by Berolzheimer, Consolidated Book Publishers, Chicago, 1945, pages 755 and 756.